(12) United States Patent
Öberg

(10) Patent No.: US 10,340,104 B2
(45) Date of Patent: Jul. 2, 2019

(54) PERMANENT SHORT-CIRCUIT DEVICE

(71) Applicant: ABB SCHWEIZ AG, Baden (CH)

(72) Inventor: Åke Öberg, Uppsala (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/566,560

(22) PCT Filed: May 7, 2015

(86) PCT No.: PCT/EP2015/060108
§ 371 (c)(1),
(2) Date: Oct. 13, 2017

(87) PCT Pub. No.: WO2016/177433
PCT Pub. Date: Nov. 10, 2016

(65) Prior Publication Data
US 2018/0096808 A1  Apr. 5, 2018

(51) Int. Cl.
*H01H 39/00* (2006.01)
*H02M 1/32* (2007.01)
*H02M 7/483* (2007.01)

(52) U.S. Cl.
CPC .......... *H01H 39/004* (2013.01); *H02M 1/32* (2013.01); *H02M 2007/4835* (2013.01)

(58) Field of Classification Search
CPC ............ H01H 39/004; H01H 39/006; H01H 2039/008; H02M 1/32; H02M 2007/4835
USPC ........................................................ 337/401
See application file for complete search history.

(56) References Cited

U.S. PATENT DOCUMENTS

| 3,248,504 A * | 4/1966 | McGirr ............... H01H 39/004 102/202.14 |
| 3,848,100 A | 11/1974 | Kozorezov et al. |
| 3,948,143 A * | 4/1976 | Olsen ................... A62C 37/10 337/401 |
| 4,150,266 A * | 4/1979 | Patrichi ............... H01H 39/004 102/202.14 |

(Continued)

FOREIGN PATENT DOCUMENTS

| CN | 2720611 Y | 8/2005 |
| DE | 975 864 | 11/1962 |

(Continued)

OTHER PUBLICATIONS

EPO machine translation of Mantel FR 2667438.*

(Continued)

*Primary Examiner* — Jacob R Crum
(74) *Attorney, Agent, or Firm* — Birch, Stewart, Kolasch & Birch, LLP

(57) ABSTRACT

A permanent short-circuit device includes an enclosure with a first and second fixed electrically conducting body, each connected to a respective conductor leaving the enclosure, the first and second bodies body each having a first and a second surface on opposite sides of the respective body, where the first surface of the first body faces the first surface of the second body and is separated therefrom by a gap with width d and the second surface of the first body is provided with explosives connected to a detonator for deforming the first body towards the first surface of the second body such that the first surface of the first body crosses the gap and galvanically connects to the first surface of the second body.

9 Claims, 6 Drawing Sheets

(56) References Cited

U.S. PATENT DOCUMENTS

| | | | | |
|---|---|---|---|---|
| 4,296,285 A * | 10/1981 | Lang | .................... | H01H 39/006 |
| | | | | 200/61.08 |
| 4,571,468 A * | 2/1986 | Weldon | ................ | H01H 39/006 |
| | | | | 200/61.08 |
| 6,107,590 A | 8/2000 | Skindhoj et al. | | |
| 7,528,332 B1 | 5/2009 | Via et al. | | |
| 2009/0008367 A1* | 1/2009 | Kriegel | ............. | H01H 33/7061 |
| | | | | 218/62 |
| 2011/0267852 A1 | 11/2011 | Asplund | | |
| 2016/0225558 A1 | 8/2016 | Chatroux et al. | | |

FOREIGN PATENT DOCUMENTS

| | | | | |
|---|---|---|---|---|
| DE | 2 103 565 | | 8/1971 | |
| DE | 199 08 576 A1 | | 8/2000 | |
| DE | 10209626 A1 * | 10/2003 | ........... | H01H 39/006 |
| EP | 2 073 229 B1 | | 8/2013 | |
| FR | 1139130 A * | 6/1957 | ............ | H01H 9/106 |
| FR | 1.605.493 | | 6/1977 | |
| FR | 2 667 438 A1 | | 4/1992 | |
| FR | 3 010 827 A1 | | 3/2015 | |
| GB | 1 307 486 | | 2/1973 | |
| WO | WO 2013/185815 A1 | | 12/2013 | |

OTHER PUBLICATIONS

International Preliminary Report on Patentability, issued in PCT/EP2015/060108, dated Apr. 21, 2017.
International Search Report, issued in PCT/EP2015/060108, dated Dec. 21, 2015.
Written Opinion of the International Searching Authority, issued in PCT/EP2015/060108, dated Dec. 21, 2015.

* cited by examiner

PERMANENT SHORT-CIRCUIT DEVICE

FIELD OF INVENTION

The present invention generally relates to power transmission applications. More particularly the present invention relates to a permanent short-circuit device for power transmission applications as well as to a converter and power transmission system comprising such a device.

BACKGROUND

It is in some high voltage power transmission applications necessary to make a mechanical switch permanently go into a certain state. This may for instance be of interest if the switch is protecting an important piece of equipment or an important part of a piece of equipment.

Such a permanent change of switching state may for instance be obtained through the use of explosives. The use of explosives has the advantage of being fast, reliable and insensitive to high current levels.

As an example CN 2720611, DE 2103565 and U.S. Pat. No. 3,848,100 are directed towards the use of explosives in order to permanently break a galvanic connection.

However, in some cases it may be necessary to permanently short-circuit a connection. In this case it may additionally be of interest that the short-circuit being obtained has a low resistance.

In this regard it is known to use explosives in order to cause a projectile to move along a longitudinal axis in order to obtain electric contact in a radial direction for ensuring a short-circuiting. This technique is for instance described in WO 2013/185815 and EP 2073229.

It can be seen that the above described designs involve closing of a switch by explosively accelerating a mass in the axial direction.

It would in view of what has been stated above be of interest to provide an alternative way of using explosives to achieve a short-circuit.

The main challenges of such a solution are:
Safe acceleration and travel of the mass
Minimize the influence of the forces induced by high current

SUMMARY OF THE INVENTION

The present invention is directed towards obtaining an improved permanent short-circuit device.

This object is according to a first aspect of the present invention achieved through a permanent short-circuit device for high-voltage power transmission applications:

the device comprising an enclosure with a first fixed electrically conducting body and a second fixed electrically conducting body, each being connected to a respective conductor leaving the enclosure, the first body having a first and a second surface on opposite sides of the first body, the second body having a first and a second surface on opposite sides of the second body, where the first surface of the first body faces the first surface of the second body and is separated therefrom by a gap with width d and the second surface of the first body is provided with explosives connected to a detonator for deforming the first body in the direction towards the first surface of the second body such that the first surface of the first body galvanically connects to the first surface of the second body across the gap.

This object is according to a second aspect of the invention achieved through a converter comprising such a permanent short-circuit device connected in parallel with an element needing protection.

The object is according to a third aspect achieved through a power transmission system comprising such a converter.

The present invention has a number of advantages. As there are only two bodies involved, the short-circuiting is easily obtained, without having to consider any further bodies or elements used for the contacting. Thereby the short-circuiting is also fast. Furthermore, there are no other factors needing to be controlled than to obtain a detonation that sufficiently deforms the first body. This simplifies the realization of the short-circuit device.

BRIEF DESCRIPTION OF THE DRAWINGS

The present invention will in the following be described with reference being made to the accompanying drawings, where FIG. 1 schematically shows a converter connected between an AC and DC power transmission system, FIG. 2 schematically shows a voltage source converter used as a static VAR compensator in an AC power transmissions system, FIG. 3 schematically shows one realization of a voltage source converter and comprising a permanent short-circuit device which can be used as a converter in both systems, FIG. 4 schematically shows a cell that may be used in the converter in FIG. 3, FIG. 5 schematically shows another realization of a voltage source converter that can be used in both systems, FIG. 6 schematically shows a permanent short-circuit device according to a first embodiment of the invention, FIG. 7 schematically shows a permanent short-circuit device according to a second embodiment of the invention before the act of short-circuiting has been performed, FIG. 8 schematically shows the permanent short-circuit device according to the second embodiment during the performing of the act of short-circuiting, FIG. 9 schematically shows the permanent short-circuit device according to the second embodiment after the act of short-circuiting has been performed, FIG. 10 schematically shows a permanent short-circuit device according to a third embodiment of the invention, and FIG. 11 schematically shows a permanent short-circuit device according to a fourth embodiment of the invention.

DETAILED DESCRIPTION OF THE INVENTION

In the following, a detailed description of preferred embodiments of the invention will be given.

The invention is concerned with a permanent short-circuit device for protecting equipment or parts of equipment in power transmission applications, such as for converters used in power transmission systems, like High Voltage Direct Current (HVDC) or Flexible Alternating Current Transmission systems (FACTS).

Converters are important equipment in power transmission systems. Converters may for instance be provided at interfaces between AC and DC power transmission systems.

Figure 1:
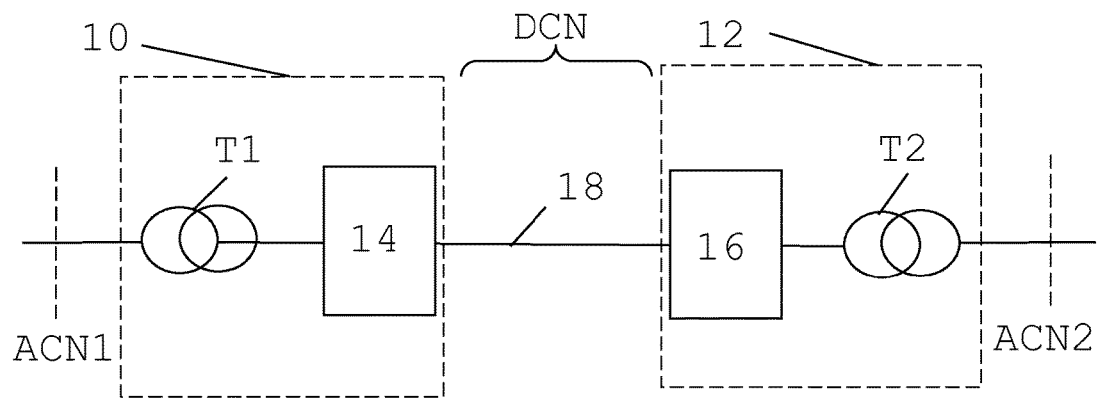

FIG. 1 shows one example of the use of converters at interfaces between AC and DC systems or networks. In FIG. 1 there is a first converter station 10 comprising a first transformer T1 and a first converter 14. The first transformer T1 interconnects the first converter 14 with a first AC network ACN1. The first converter 14 in the first converter station 10 is in turn connected to a second converter 16 in a second converter station 12 via a DC transmission line 18 of a DC network DCN. The second converter 16 is in turn connected to a second AC network ACN2 via a second transformer T2. The first and second converters 14 and 16 are examples of power transmission equipment that comprise elements needing protection. The first converter 14 may here be considered to be a part of the DC network DCN. As an alternative it may be considered to form a part of the first AC network ACN1.

Figure 2:
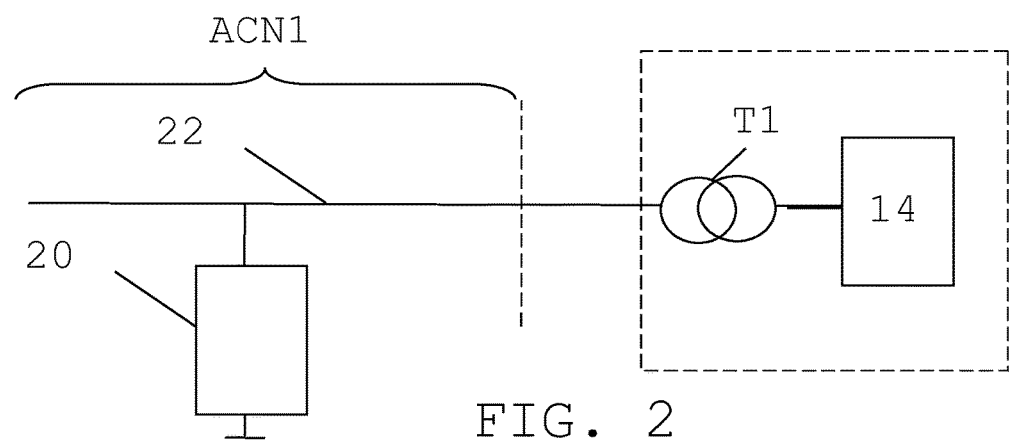

However, converters may also be used in other circumstances than in converter stations between AC and DC networks. They may as an example also be provided as a part of an AC network for providing reactive power compensation. One example of this is shown in FIG. 2 which shows a single line diagram of a static VAR compensator 20 connected to a three-phase power line 22 of the first AC network ACN.

Figure 3:
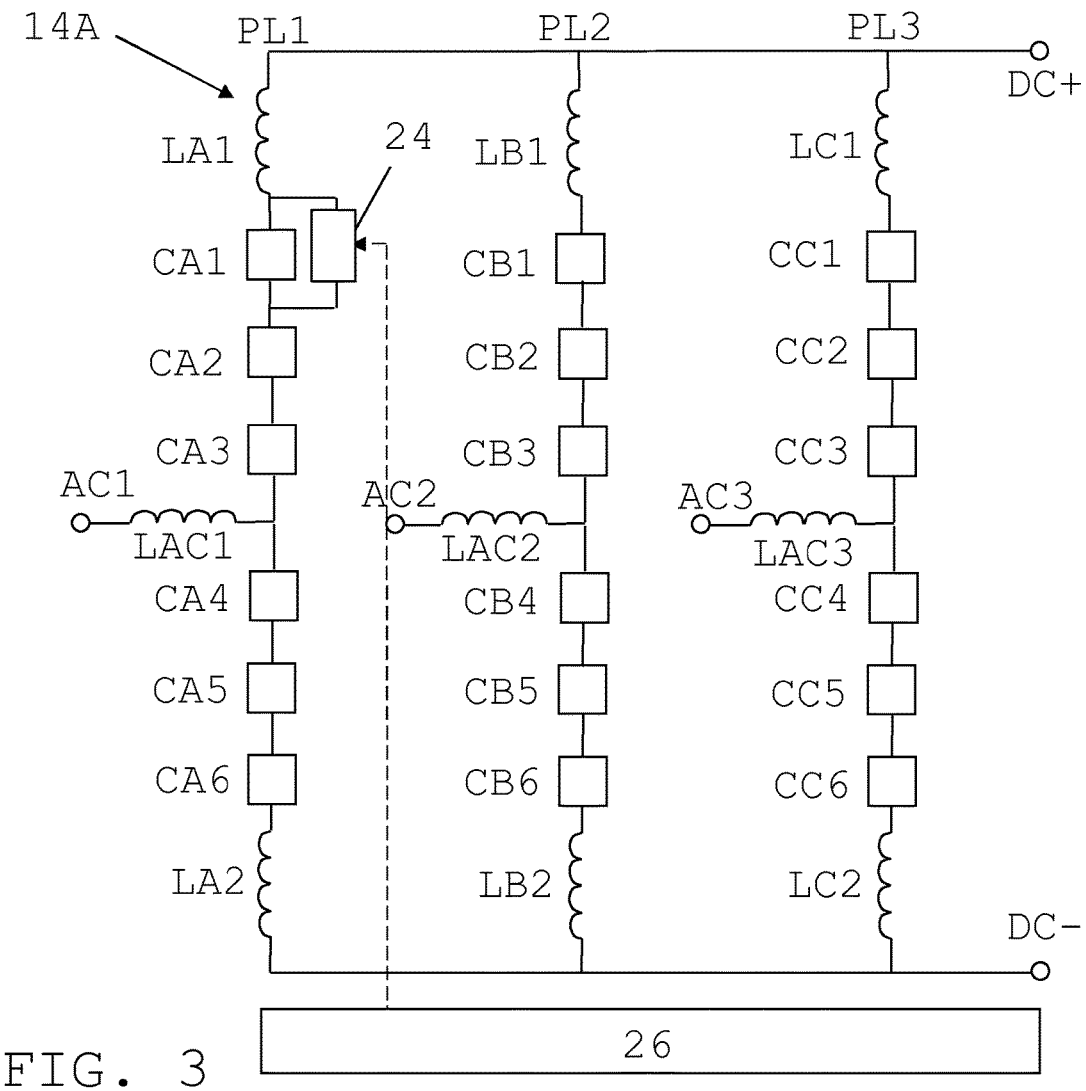

FIG. 3 schematically shows one realization 14A of the first converter in FIG. 1.

The converter 14A comprises a three-phase bridge made up of a number of phase legs. There are in this case three phase legs. There is a first phase leg PL1, a second phase leg PL2 and a third phase leg PL3. The phase legs are more particularly connected between a first and a second direct current (DC) pole, where the first pole provides a first voltage DC+ and the second pole P2 provides a second voltage DC−. The mid points of the phase legs are each connected to a corresponding alternating current terminal AC1, AC2, AC3. The midpoints are furthermore connected to an alternating current (AC) terminal AC1, AC2 and AC3 via a corresponding reactor LAC1, LAC2 and LAC3 and the AC terminals are in turn connected to windings of the first transformer TR1 (not shown).

The phase legs are made up of a number of valves and in this case an upper valve and a lower valve. In case the converter is a voltage source converter, the valves may be based on switches, such as Insulated Gate Bipolar Transistor (IGBT) switches. In the present example the converter is a multilevel voltage source converter and therefore the valves are based on cells. In this case the upper valve of the first phase leg PL1 comprises a first, second and third cell CA1, CA2 and CA3, while the lower valve comprises a fourth, fifth and sixth cell CA4, CA5 and CA6. As can also be seen in FIG. 3, the first cell CA1 is connected to the first pole via a reactor LA1, while the sixth cell CA6 is connected to the second pole via a reactor LA2. In a similar manner, the upper valve of the second phase leg PL1 comprises a first, second and third cell CB1, CB2 and CB3, while the lower valve comprises a fourth, fifth and sixth cell CB4, CB5 and CB6. As can also be seen the first cell CB1 is connected to the first pole via a reactor LB1, while the sixth cell CB6 is connected to the second pole via a reactor LB2. Also the upper valve of the third phase leg PL3 comprises a first, second and third cell CC1, CC2 and CC3, while the lower valve comprises a fourth, fifth and sixth cell CC4, CBC5 and CC6. As can also be seen the first cell CC1 is connected to the first pole via a reactor LC1, while the sixth cell CC6 is connected to the second pole via a reactor LC2.

Finally there is shown a permanent short-circuit device 24 in parallel with the first cell CA1 of the first phase leg PL1 and a control unit 26 controlling the short-circuit device 24.

There are several ways in which the control unit 26 may be implemented. The control unit 26 may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter.

It should here be realized that there may be several more short-circuit devices 24. There may for instance be one in parallel with each cell. The control unit 26 may also be provided for controlling other aspects of the converter such as controlling the cells to form an AC voltage on the AC voltage terminals.

It may here be stated that also the SVC of FIG. 2 may be provided through three phase legs, where each phase leg would be connected between two phases of the AC transmission line 22. The phase legs may in this case be Δ connected between the phase conductors of the AC transmission line 22.

The cells of a converter together provide multiple voltage levels. The multilevel cells may be half-bridge cells, meaning that they provide either a voltage contribution corresponding to the voltage across an energy storage element of the cell or a zero voltage, which energy storage element may be a capacitor. The cells may thus be cascaded two-level cells (CTL). It should however be realized that the cells may as an alternative also be full-bridge cells. It is also possible with other types of cells, for instance cells employing two capacitors.

Multilevel does in this regard mean that the cells together provide multiple levels that are used for forming an AC voltage.

Figure 4:
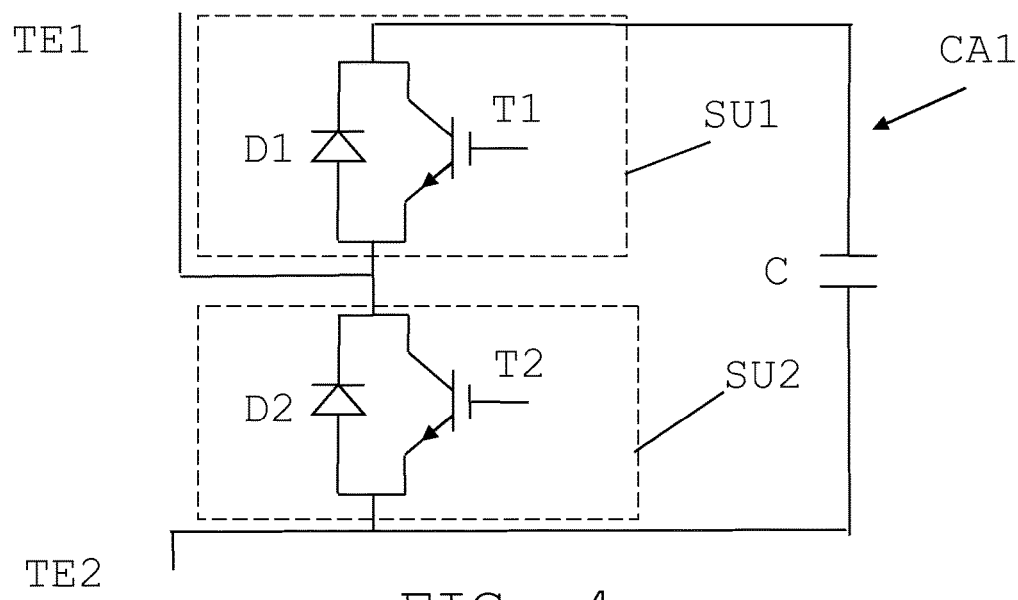

FIG. 4 shows an example of an implementation of the cell CA1 in FIG. 3 as a half-bridge cell.

The cell CA1 includes a capacitor C, which is connected in parallel with a first group of switching units. The switching units SU1 and SU2 in the first group are connected in series with each other. The first group thus here includes two switching units SU1 and SU2 (shown as dashed boxes), where each switching unit SU1, SU2 may be realized in the form of an electronic switch that may be an IGBT (Insulated Gate Bipolar Transistor) transistor together with an anti-parallel diode. In FIG. 4 there is therefore a first switching unit SU1 having a first transistor T1 with a first anti-parallel diode D1. There is also a second switching unit SU2 connected in series with the first switching unit SU2 and having second transistor T2 with anti-parallel second diode D2.

The cell has a first connection terminal TE1 and a second connection terminal TE2, each providing a connection for the cell to a phase leg of the converter. In this type of cell the first connection terminal TE1 more particularly provides a connection from the phase leg to the junction between the first and the second switching unit SU1 and SU2, while the second connection terminal TE2 provides a connection from the phase leg to the junction between the second switching unit SU2 and the capacitor C. These connection terminals TE1 and TE2 thus provide points where the cell can be connected to the phase leg.

As can be understood from FIGS. 3 and 4, the short-circuit device 24 may be connected between the two cell connection terminals TE1 and TE2 in order to obtain a bypass of the cell. This connection would furthermore typically be made independently of which type of cell that is being protected.

Figure 5:
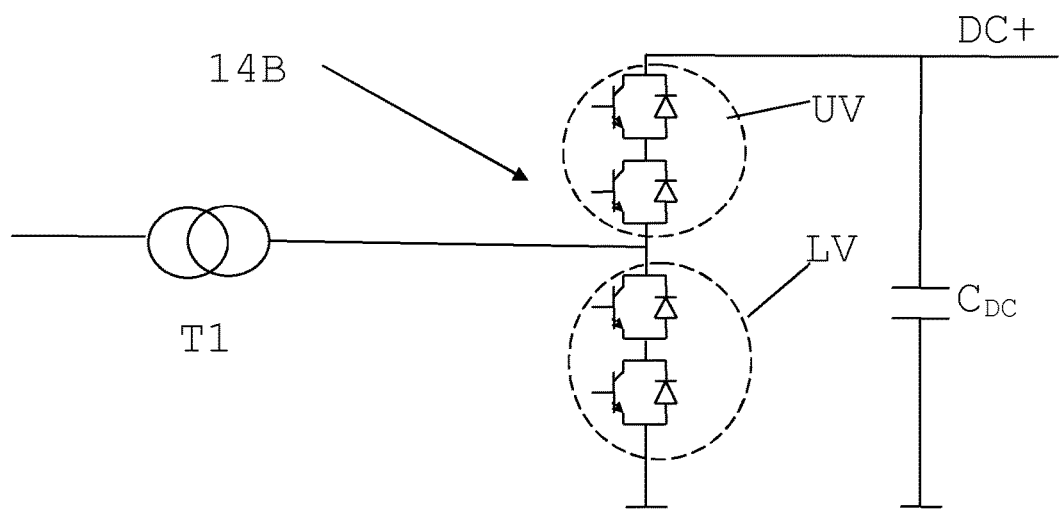

A voltage source converter may also be a two-level converter. One example of such a converter 14B is schematically shown in FIG. 5. There is in this case only one pole, the first pole with voltage DC+. In this specific example the upper and lower valves UV and LV are connected between this first pole and ground. The midpoint of the phase leg is as in FIG. 3 connected to the first AC network via the first transformer T1. In this case each valve UV and LV is made up of a number switching units, i.e. the combination of switch and anti-parallel diode. There is also a DC capacitor $C_{DC}$ connected between the pole and ground. A whole valve or a limited number of switching units of a valve, such as only one, may in this case be connected in parallel with a short-circuit device.

Equipment used in converters is expensive because of the high current and voltage levels involved. It therefore needs to be protected. This may especially be the case if the equipment comprises cells comprising a number of switching units. However, also individual switching units may be valuable enough for being protected. If a valve, cell or a switching unit becomes faulty, it may thus need to be by-passed for protection purposes. This bypassing may need to be performed fast and may additionally need to be made as a permanent by-pass at least until the equipment is to be serviced.

One way of achieving this is through the use of a mechanical switch that is actuated using explosives.

Put differently, in some cases it may be necessary to permanently short-circuit a valve or a part of a valve of a converter, such as a converter operating to convert between AC and DC or a converter provided for reactive power compensation like a Static Var Compensator.

It is in such situations important that the short-circuit is made fast and reliably. It may also be important that the cost and complexity of the short circuit device is kept low.

Traditionally such a short-circuit has been obtained using a mechanical switch where a projectile is made to travel a distance in an axial or longitudinal direction in order essentially close a contact between two contacting elements in a radial direction in relation to the direction of travel of the projectile.

The present invention is directed towards providing alternatives to this principle.

Figure 6:
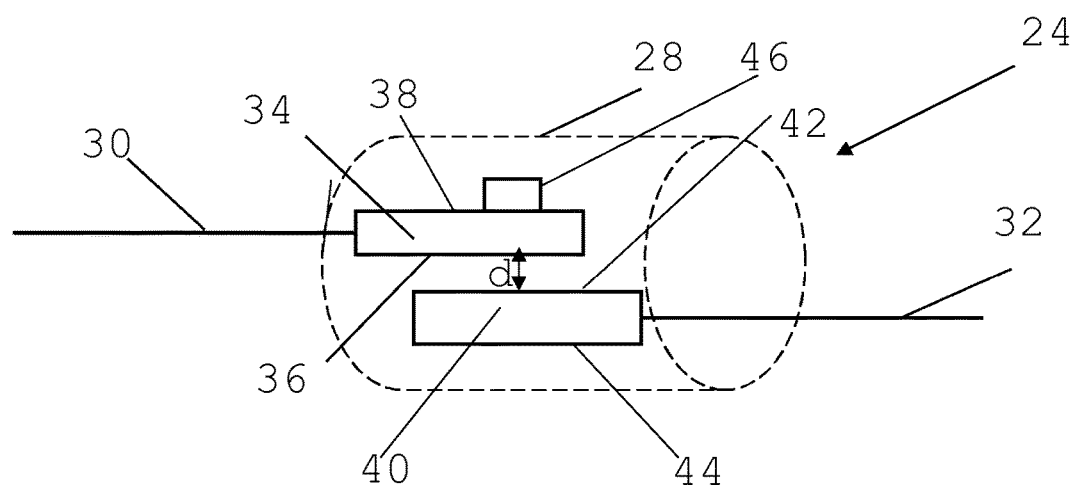

FIG. 6 schematically shows a first embodiment of the permanent short-circuit device 24 according to the invention. The device 24, which operates as a mechanical switch, comprises an enclosure 28 into which a first conductor 30 and second conductor 32 are leading, where the conductors enter the enclosure 28 from opposite directions. The first conductor 30 is, in the interior of the enclosure 28, galvanically connected to a first electrically conducting body 34, i.e. to a body of a material having good electrical conduction properties, and the second conductor 32 is, also in the interior of the enclosure 28, connected to a second electrically conducting body 40. The two bodies 34 and 40 may with advantage be provided through a material such as copper or aluminum. The bodies may furthermore both be elongated and thus extend along a corresponding longitudinal axis. Both bodies are furthermore fixed, in that they have a fixed position in the enclosure. The enclosure 28 may with advantage also include an insulating fluid or medium, such as an insulating gas like $SF_6$ or $CO_2$.

The first body 34 furthermore has a first surface 36 and a second surface 38, where the second surface 38 is opposite of the first surface 34. Both surfaces may furthermore with advantage be perpendicular to the longitudinal axis of the body 34. The first surface 36 may face inwards towards the center of the enclosure 28, while the second surface 38 may face outwards towards the wall of the enclosure 28. Both surfaces 36 and 38 may in this case with advantage be provided on opposite sides of the longitudinal axis of the first body 34.

The second body 40 may likewise have a similar shape. It may also have a first surface 42 and a second surface 44, where the second surface 44 is opposite of the first surface 42. Both surfaces may furthermore with advantage be perpendicular to and provided on opposite sides of the longitudinal axis of the body 40. The first surface 42 may also in this case face inwards towards the center of the enclosure, while the second surface 44 may face outwards towards the enclosure wall. The first surfaces 36 and 42 of the first and second bodies 34 and 40 may more particularly be perpendicular to the longitudinal axes of both the bodies and do also face each other. They are furthermore separated from each other by a gap having a width d. They are thus distanced from each other with a distance d.

In the first embodiment the two bodies are realized as flat or planar plates. The second surface 38 of the first body 34 is also provided with explosives 46. The explosives 46 may thus be attached to the second surface 38 and may furthermore be set to blast when being ignited, at least in a direction towards the first surface 36 of the first body 34.

This is done so that the first body 34 is deformed in the direction towards the second body 40, which causes the first surface 36 of the first body 34 to galvanically connect to the first surface 42 of the second body 40. It is in this case possible that the thickness of the material between the two surfaces 36 and 38 of the first body 34 is lower in the region where the explosives 46 are applied than in the rest of the body. The body may thus have less material in this area than in the rest of the body. The amount of first body material between the first and second surfaces 36, 38 is thus lower in the detonation zone than in the rest of the first body 34. The amount may more particularly be less in relation to the length of the body. The amount of material per meter along the longitudinal axis may thus be lower in the detonation zone than in the rest of the body. This may be done through making the body thinner or through providing the zone with holes or slits. The region or area is here termed a detonation zone because it is in this zone where a detonation is to take place. The removal of material or provision of less material may be done in order to obtain the desired deformation of the body at right angles to the longitudinal axis. The amount of material that is removed or left out may be sufficient for ensuring that a detonation causes the first surface 36 of the first body 34 to traverse the distance d for making galvanic contact with the first surface 42 of the second body 40.

After ignition of the explosives 46, the blast then causes a permanent galvanic connection between the first body 34 and the second body 40. Furthermore, it is possible that the blast also serves another purpose, namely the purpose of expelling insulation fluid from the enclosure 28.

There are several advantages associated with the first embodiment. As there are only two bodies involved, the short-circuiting is easily obtained, without having to consider any further bodies or elements used for the contacting. Thereby it is also fast. Furthermore, there are no other factors needing to be controlled than to obtain a detonation that sufficiently deforms the first body. This simplifies the realization of the short-circuit device.

Figure 7:
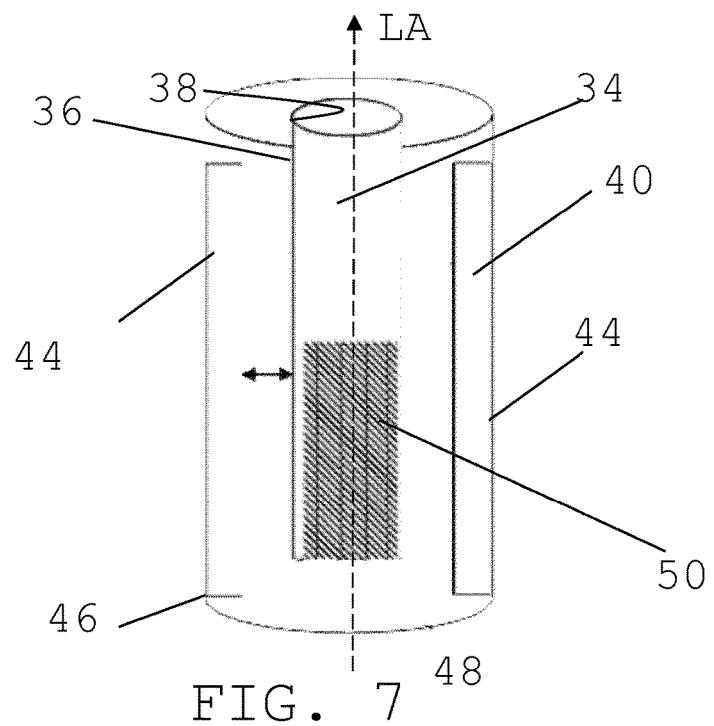
Figure 8:
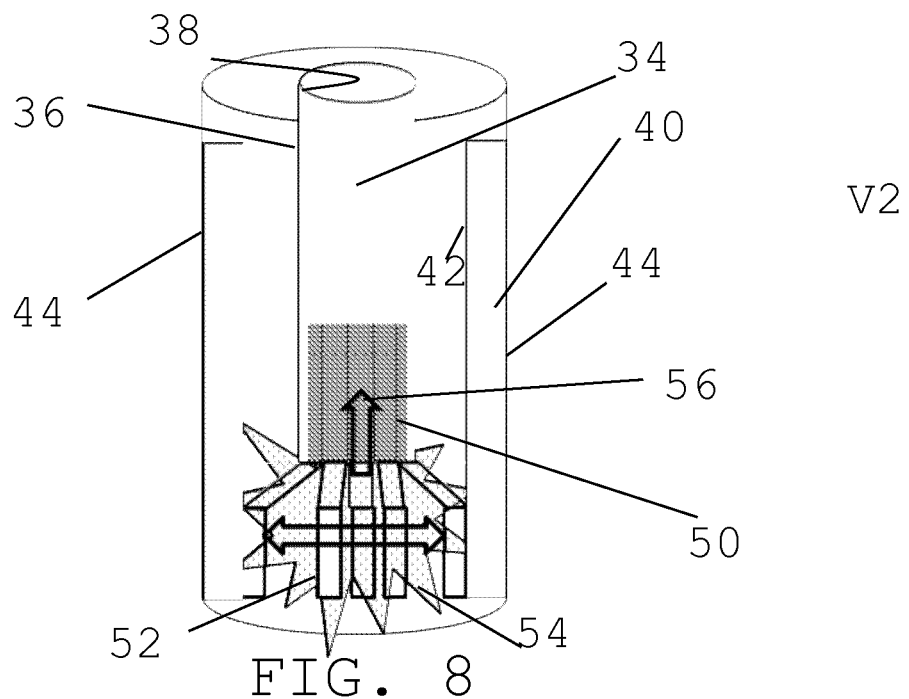
Figure 9:
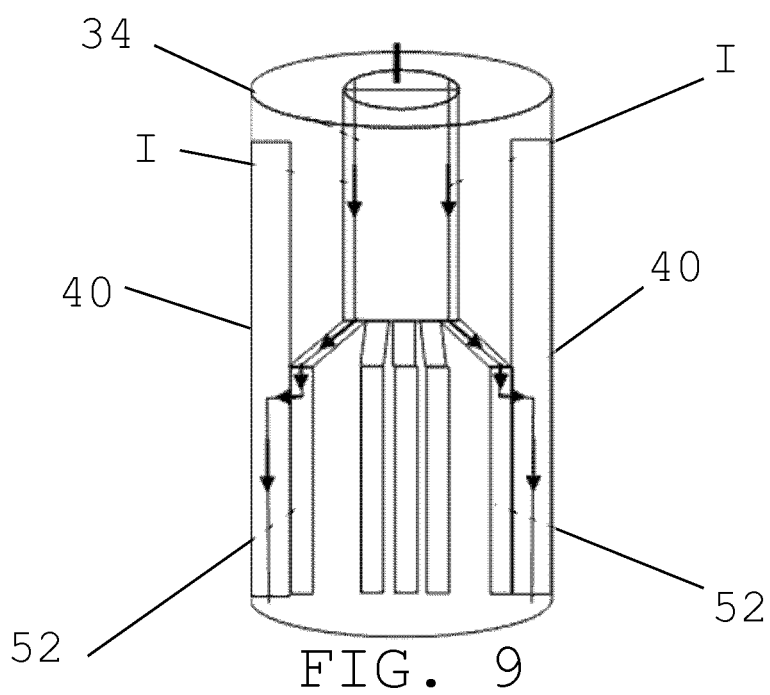

FIG. 7-9 show a second preferred embodiment of the short-circuit device 24, where FIG. 7 shows the device in schematic form before the explosives are detonated, FIG. 8 shows the device in schematic form during the detonation process and FIG. 9 shows the device in schematic form after a completed detonation.

As can be seen in FIG. 7, both the first and second bodies 34 and 40 are realized in the form of hollow tubes or cylinders fixed inside the enclosure. In this case the first body 34 is provided inside the second body 40. They are thus coaxial around a common longitudinal axis LA. The first surface 36 of the first body 34 is here the outer surface of the inner cylinder and the second surface 38 of the first body 34 is the inner surface of the inner cylinder. In a similar manner the first surface 42 of the second body 40 is the inner surface of the outer cylinder and the second surface 44 of the second body 40 is the outer surface of the outer cylinder. The distance or gap between the outer surface of the inner cylinder and the inner surface of the outer cylinder furthermore also here has the width d. The two first surfaces 36 and 42 are thus distanced form each other by a distance d.

The two bodies 34 and 40 may also in this embodiment be made of suitable electrically conductive material such as copper or aluminum. The enclosure may also enclose an insulating medium such as an insulating fluid like $SF_6$ or $CO_2$.

The first body 34 is in this case at a first end attached to the first conductor (not shown). However in a second opposite end along the longitudinal axis LA, i.e. the cylinder axis, the beginning of the detonation zone is provided. The detonation zone thus starts or begins at the second end of the inner cylinder and then stretches therefrom a length towards the first end. The detonation zone may stretch as long as halfway towards the first end. It may however be shorter, such as stretching a third of the way. It may even stretch longer. The second end of the first body 34 is an end of the first body where the first and second surfaces 36 and 38 meet. At the same time it is an open end of the inner cylinder. The explosives are provided in the detonation zone starting from this second end. In this embodiment the explosives are more particularly provided in the interior of the cylinder, i.e. on the second surface 38 of the first body 34. As the zone is a detonation zone, also a detonator 48 is placed in contact with the explosives 46 at the second end, which detonator 48 is to be activated by the control unit.

Furthermore, first body material has been removed in the detonation zone so that slits 50 have been formed. The amount of material per meter along the longitudinal axis is thus in this case lower than in the rest of the body through the provision of slits. The slits 50 are slits that stretch along the periphery of the cylinder in the detonation zone, i.e. from the second end in parallel with the cylinder axis LA in a direction towards the first end. Through the provision of slits 50, it can furthermore be seen that a number of spaced apart fingers are formed, which fingers may be evenly distributed around the cylinder axis LA. The slits may have a design selected for achieving deformation of the fingers given a certain blast provided by the explosives so that the fingers bridge the gap d between the first and second bodies 34 and 40. The length and width of the fingers as defined by the slits 50 may thus be selected such that the gap d is bridged and galvanic contact is obtained. As an example, the slit length may be 1-15 times the gap d and with advantage at least 1.5 times the gap d, the slit width may be $1/10$-$1/2$ times the gap d, the diameter of the outer cylinder may be 11-20 times d and the diameter of the inner cylinder may be to 10-19 times d. The thickness of the inner and outer cylinders may both be in the range $1/25$-2 times d. In case the gap is to 10-50 mm, this means that the slit length may be 40-150 mm, the slit width 5-20 mm, the diameter of the outer cylinder 110-200 mm, the diameter of the inner cylinder 100-190 mm and the cylinder thicknesses 2-20 mm.

In case protection is to be activated, the control unit emits a control signal, which ignites the detonator 48. How this influences the two bodies is schematically shown in FIG. 8. As the detonator 48 is ignited, it causes the explosives to explode 54. The explosion moves inside the first body 34 in the detonation zone along the arrow 56. The explosion more particularly causes a shockwave to be generated in a radial direction in relation to the longitudinal cylinder axis LA. This deforms the fingers 52 so that they are pushed away radially from the cylinder axis LA. They are furthermore pushed away so that they are forced into contact with the first surface 42 of the second body 40. The explosion may furthermore cause the first surfaces 36 and 42 of the two bodies to be welded together thereby ensuring a reliable connection. The explosion may additionally force out the insulating medium from the enclosure, at least in the area of the detonation zone, which improves the galvanic contact even further.

FIG. 9 schematically shows the device after the blast. As can be seen there is a safe galvanic contact between the fingers 52 of the first body 34 and the first surface of the second body 40, where there is a current I running through the unaltered part of the first body 34 via the fingers 52 into the second body 40.

As can be seen the second embodiment of the invention is based on a lateral expansion of an inner metallic cylinder or tube onto the inner surface of an outer cylinder or tube, where the inner cylinder is equipped with slitted "fingers" and provided with an appropriate amount of explosives inside the inner cylinder having an accurate detonation velocity.

With the detonator 48 provided at the second end of the inner cylinder or tube, the detonation will be initiated in the lower part of the explosives and propagates axially in the inner tube. The slitted fingers may thereby be accelerated to create an expansion against the outer tube. When the fingers impact into the inner tube surface of the outer cylinder, they may form a pure solid state metallic weld, thereby creating a connection of very low contact resistance.

There are several advantages associated with the second embodiment. As there are only two bodies involved, the short-circuiting is easily obtained, without having to consider any further bodies or elements used for the contacting. Direct acceleration in the radial direction is also obtained. There is no axial travel of mass. Thereby the short-circuiting is also fast. It is for instance possible to tune the detonation velocity between 500 and 5000 m/s. There are no other factors needing to be controlled than to obtain a detonation that sufficiently deforms the first body. As the detonation is made in the interior of a cylinder, the blast in the radial direction is furthermore enhanced, which allows an efficient use of explosives. Through the providing of several fingers, there is also redundancy with regard to electrical contacts. It is possible to obtain short-circuiting without all the fingers contacting the second body. It is thus possible to obtain electrical contacting and thus short-circuiting without an optimally set explosion. As the blast is directly affecting the first and second bodies, it is also possible to obtain a strong metallic bond as a solid state weld. It is furthermore possible to remove possible oxides on the first surfaces of the first and second bodies, thereby obtaining a better galvanic connection. It is in fact possible to obtain a connection with a resistance close to zero.

Figure 10:
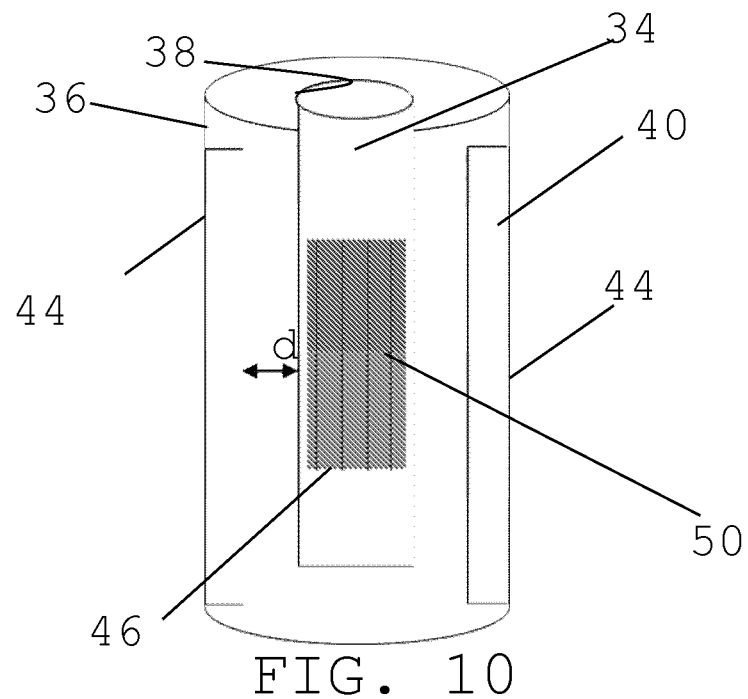
Figure 11:
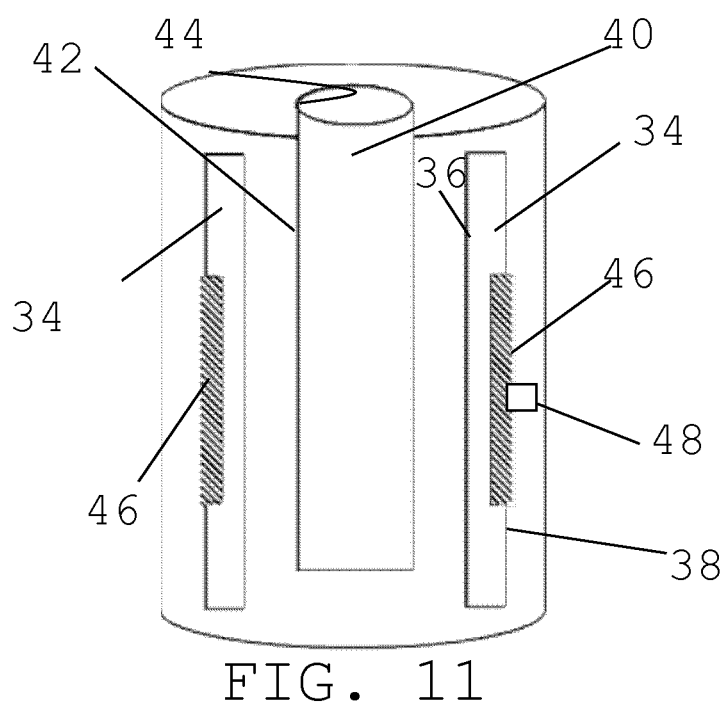

It is possible to vary the invention in a number of ways, of which two are shown in FIGS. 10 and 11.

It is for instance possible that the detonation zone, slits and the explosives are provided at a distance from the second end, for instance in the middle of the first body 34, i.e. in-between the first and second ends of the first body 34. The detonation zone with less material may thus be separated from both cylinder ends by zones with normal amounts of material. The slits may in this case be twice as long as the slits of the second embodiment. The cylinder wall may in this example be solid on both sides of the detonation zone, which situation is schematically shown in FIG. 10.

The first body 34 does not need to be the inner cylinder. It may just as well be the outer cylinder, as shown in FIG. 11. In this case the detonation zone 46 with explosives is provided on the outer surface of the outer cylinder, which is thus the second surface 38 of the first body 34. In this specific variation there are also no slits in the zone with the explosives. Instead the material thickness in this region, between the inner and outer surface of the outer cylinder, is lower than in the rest of the first body 34 thereby ensuring that the first body is sufficiently deformed. In this case the blast causes the deformation to be made radially onwards in a direction towards the longitudinal axis.

It should here be realized that the change of thickness in the detonation zone may be interspersed with areas of normal thickness. The outer cylinder may thus be made of rings with differing thicknesses in the detonation zone, where some rings have a lower thickness than the rest. As an alternative it is possible to provide the area with slits. These slits may furthermore be located at an end of the outer cylinder. However, in this case the slits may be provided in the opposite end compared with in the second embodiment, which is due to where connection to the conductor is being made. The variations of material thickness may also be made at such an end.

From the foregoing discussion it is evident that the present invention can be varied in a multitude of ways. It shall consequently be realized that the present invention is only to be limited by the following claims.

The invention claimed is:

1. A permanent short-circuit device for high-voltage power transmission applications, comprising:
   an enclosure with a first fixed electrically conducting body and a second fixed electrically conducting body, each being connected to a respective conductor leaving the enclosure,
   wherein the first body has a first and a second surface on opposite sides of the first body,
   wherein the second body has a first and a second surface on opposite sides of the second body, and
   where the first surface of the first body faces the first surface of the second body and is separated therefrom by a gap with width d and the second surface of the first body is provided with explosives connected to a detonator for deforming the first body in the direction towards the first surface of the second body such that the first surface of the first body galvanically connects to the first surface of the second body across the gap, wherein the first and second bodies are tubes, where the first body is an outer body encircling the second body.

2. The permanent short-circuit device according claim 1, the first body having at least one detonation zone in the area where the explosives are applied, where the amount of first body material between the first and second surfaces is lower in the detonation zone than in the rest of the first body.

3. The permanent short-circuit device according to claim 2, wherein the first body comprises slits in the detonation zone.

4. The permanent short-circuit device according to claim 3, wherein the first body is elongated and the slits stretch along the longitudinal axis of the first body.

5. The permanent short-circuit device according to claim 1, wherein the first body has a first end at which it is connected to the corresponding conductor and a second opposite end where the first surface transitions into the second surface.

6. The permanent short-circuit device according to claim 5, wherein the detonation zone begins at the second end, which is open, and stretches towards the first end.

7. The permanent short-circuit device according to claim 6, wherein the first body has at least one detonation zone in the area where the explosives are applied, where the amount of first body material between the first and second surfaces is lower in the detonation zone than in the rest of the first body,
   wherein the first body comprises slits in the detonation zone, and
   wherein the slit has a length that is at least 1.5 times the width d of the gap.

8. A voltage source converter comprising the permanent short-circuit device according to claim 1 connected in parallel with an element needing protection.

9. A power transmission network comprising the voltage source converter according to claim 8.

* * * * *